United States Patent
Pettus

(10) Patent No.: US 11,288,468 B2
(45) Date of Patent: *Mar. 29, 2022

(54) MULTIMODE MILLIMETER WAVE RFID DEVICES AND METHODS OF USE THEREOF

(71) Applicant: Vubiq Networks, Inc., Irvine, CA (US)

(72) Inventor: Michael Gregory Pettus, San Juan Capistrano, CA (US)

(73) Assignee: Vubiq Networks, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/072,683

(22) Filed: Oct. 16, 2020

(65) Prior Publication Data

US 2021/0034828 A1 Feb. 4, 2021

Related U.S. Application Data

(63) Continuation of application No. 16/656,088, filed on Oct. 17, 2019, now Pat. No. 10,839,179.

(Continued)

(51) Int. Cl.
*G06K 7/10* (2006.01)
*H01Q 3/26* (2006.01)
*G01S 13/90* (2006.01)

(52) U.S. Cl.
CPC ...... *G06K 7/10386* (2013.01); *G01S 13/9011* (2013.01); *G01S 13/9089* (2019.05); *G06K 7/10099* (2013.01); *H01Q 3/26* (2013.01)

(58) Field of Classification Search
CPC ........... G06K 7/10386; G06K 7/10099; G06K 19/067; G06K 7/10356; H01Q 3/26;

(Continued)

(56) References Cited

U.S. PATENT DOCUMENTS 7,545,309 B1 6/2009 McIntire et al.
7,878,408 B2 2/2011 Lapstun et al.

(Continued)

FOREIGN PATENT DOCUMENTS

WO 20150092333 A1 6/2015

OTHER PUBLICATIONS

Keysight Technologies. "Radar Modem Library Offering the Fastest Path from Radar/EW Design to Verification and Test," Published in USA, Aug. 3, 2016 5990-6347EN www.keysight.com [retrieved on Dec. 4, 2019]. Retrieved from the Internet: <URL: http://literature.cdn.keysight.com/litweb/pdf/5990-634 7EN.pdf>.

(Continued)

*Primary Examiner* — Eric Blount
(74) *Attorney, Agent, or Firm* — Bond, Schoeneck & King PLLC; Bryan C. Smith

(57) ABSTRACT

A radiofrequency identification (RFID) reader device includes a radiofrequency device configured to transmit and receive electromagnetic radiation through an antenna array. An RFID control computing device is coupled to the radiofrequency device and includes a memory coupled to a processor which is configured to be capable of executing programmed instructions comprising and stored in the memory to operate the radiofrequency device in a first mode to transmit a first radiofrequency beam to a scan area through the antenna array. A spatial location for RFID tags located within the scanned area is determined from a radar image. The radiofrequency device is operated in a second mode to transmit a second radiofrequency beam to at least one of the RFID tags, based on the determined spatial location of the RFID tags, to power an integrated circuit or sensor located on and to communicate with the at least one of the RFID tags.

33 Claims, 5 Drawing Sheets

Related U.S. Application Data

(60) Provisional application No. 62/746,829, filed on Oct. 17, 2018.

(58) Field of Classification Search
CPC ............. G01S 13/9011; G01S 13/9089; G01S 13/90; G01S 13/82
USPC .......................................... 340/572.1–572.8
See application file for complete search history.

(56) References Cited

U.S. PATENT DOCUMENTS

| | | | |
|---|---|---|---|
| 2005/0280539 A1* | 12/2005 | Pettus | G06K 19/067 340/572.1 |
| 2014/0292492 A1 | 10/2014 | Sadr | |
| 2016/0014558 A1 | 1/2016 | Berlin et al. | |
| 2017/0254876 A1 | 9/2017 | Wulff | |

OTHER PUBLICATIONS

Statnikov et al. "A 240-GHz circularly polarized FMCW Radar based on a SiGe Transceiver with a lens-coupled on-chip antenna," International Journal of Microwave and Wireless Technologies, 2015, 7(3/4), 415-423. # Cambridge University Press and the European Microwave Association, 2015 doi:10.1017/S1759078715000379 (retrieved on Dec. 4, 2019]. Retrieved from the Internet: <URL: https://search.proquest.com/docview/1697534826/fulltextPDF/2979289O031144D3PQ/1? accountId= 142944>.
International Search Report and Written Opinion for corresponding PCT Application No. PCT/US19/56753, dated Jan. 2, 2020.

\* cited by examiner

MULTIMODE MILLIMETER WAVE RFID DEVICES AND METHODS OF USE THEREOF

This application is a continuation of U.S. patent application Ser. No. 16/656,088, filed Oct. 17, 2019, which claims benefit of U.S. Provisional Patent Application Ser. No. 62/746,829, filed Oct. 17, 2018 the entirety of which is incorporated herein by reference.

FIELD

This technology generally relates to a radiofrequency identification (RFID) systems and, in particular, to multimode millimeter wave RFID devices and methods of use thereof.

BACKGROUND

Existing radio frequency identification (RFID) systems use an integrated circuit or chip (IC) on the RFID tags attached to the items to be tracked. The IC on the RFID tags allows for the use of a device, composed of a wireless transmitter and receiver, that imparts transmitted wireless power to the IC located on the RFID tags. This class of RFID tags is designated as passive, meaning there is no local power source. The IC receives, and turns on a response to, the "read request" from the reader device. As such, the RFID tag is acting as a transponder. The IC also typically contains identification and other data that the reader then records or communicates to other parts of the RFID system.

Another type of RFID technology uses tags without ICs or chips, and is designated as a "chip-less" RFID system. One form of the chip-less RFID systems make use of millimeter wave synthetic aperture radar (SAR) technology or a radar backscatter approach to allow for communications between the reader and the chip-less RFID tags. However, the use of this form of chip-less RFID tags is limited to readers employing the SAR or backscatter technologies.

It is anticipated that RFID technology will be employed in the internet of things (IOT), which includes smart objects with local storage and/or local sensors that are connected to the Internet at large. There are two major challenges for the use of existing RFID technology in connection with IOT technology: (1) the power required for the devices, and (2) communications between the device and the Internet.

There is an entire class of IOT devices that do not require continuous power for operation, such as smart sensors that have the ability to detect their state when powered, and to communicate that state during a read. Thus, there is a need to employ readers that can also power such devices for communication.

RFID tags that would be utilized for IOT and smart sensor applications are small in size. The small size of the RFID tags prohibits using antennas on the tags. As a result, the RFID tags cannot be located in the far-field from the reader during operation. Instead, magnetic or capacitive near-field coupling must be used to power and communicate with the RFID tag. Near-field coupling results in distances of less than a few centimeters from the tag for operation, which limits the ability to employ such devices for the IOT.

SUMMARY

A radiofrequency identification (RFID) reader device includes a radiofrequency device configured to transmit and receive electromagnetic radiation through an antenna array coupled to the radiofrequency device. An RFID control computing device is coupled to the radiofrequency device and includes a memory coupled to a processor which is configured to be capable of executing programmed instructions comprising and stored in the memory to operate the radiofrequency device in a first mode to transmit a first radiofrequency beam to a scan area through the antenna array. A spatial location for one or more RFID tags located within the scanned area is determined from a radar image generated based on reflected radiofrequency beams from the scan area and re-radiated radiofrequency beams from the one or more RFID tags located within the scan area resulting from the transmission of the first radiofrequency beam to the scan area. The radiofrequency device is operated in a second mode to transmit a second radiofrequency beam to at least one of the one or more RFID tags, based on the determined spatial location of the one or more RFID tags located within the scan area, to power an integrated circuit or sensor located on and to communicate with the at least one of the one or more RFID tags.

A method includes transmitting, by a radiofrequency device, a first radiofrequency beam towards a scan area through an antenna array. A spatial location is determined for one or more RFID tags located within the scan area from a radar image generated based on reflected radiofrequency beams from the scan area and re-radiated radiofrequency beams from the one or more RFID tags located within the scan area resulting from the transmission of the first radiofrequency beam to the scan area. A second radiofrequency beam is transmitted to at least one of the one or more RFID tags, based on the determined spatial location of the one or more RFID tags located within the scan area.

The present technology advantageously provides a system that has dual mode capability for identification and communication with various types of RFID tags. The system can be implemented using extremely high frequency wireless technology that is advantageously designed to image and locate various types of RFID tags and smart sensors using synthetic aperture radar (SAR) while in a wide antenna beam pattern mode, and then shift to a narrow, beam steered mode for powering and communicating with the RFID tags or smart sensors. The system has the capability to operate in the radar imaging mode to locate various types of chip-less and chipped RFID tags, as well as Internet of Things (IOT) devices, with a high degree of accuracy. Once the tags or devices are located, the system has the additional capability of powering and communicating with the RFID tags in the far-field.

The system can be employed and provide the aforementioned advantages in any usage requiring RFID tag or sensor operation, including, but not limited to: inventory identification; asset management tracking and shipping container location; vehicular access control (e.g. toll ways); moving vehicle identification; healthcare identification and tracking of patients, drugs, equipment and personnel identification, tracking and monitoring of personnel and equipment for security purposes; identification of luggage and packages at airports; systems for locating lost objects (e.g. keys, files, golf balls, clothing articles), although any other uses, including uses for the IOT are contemplated.

DETAILED DESCRIPTION

Figure 1A:
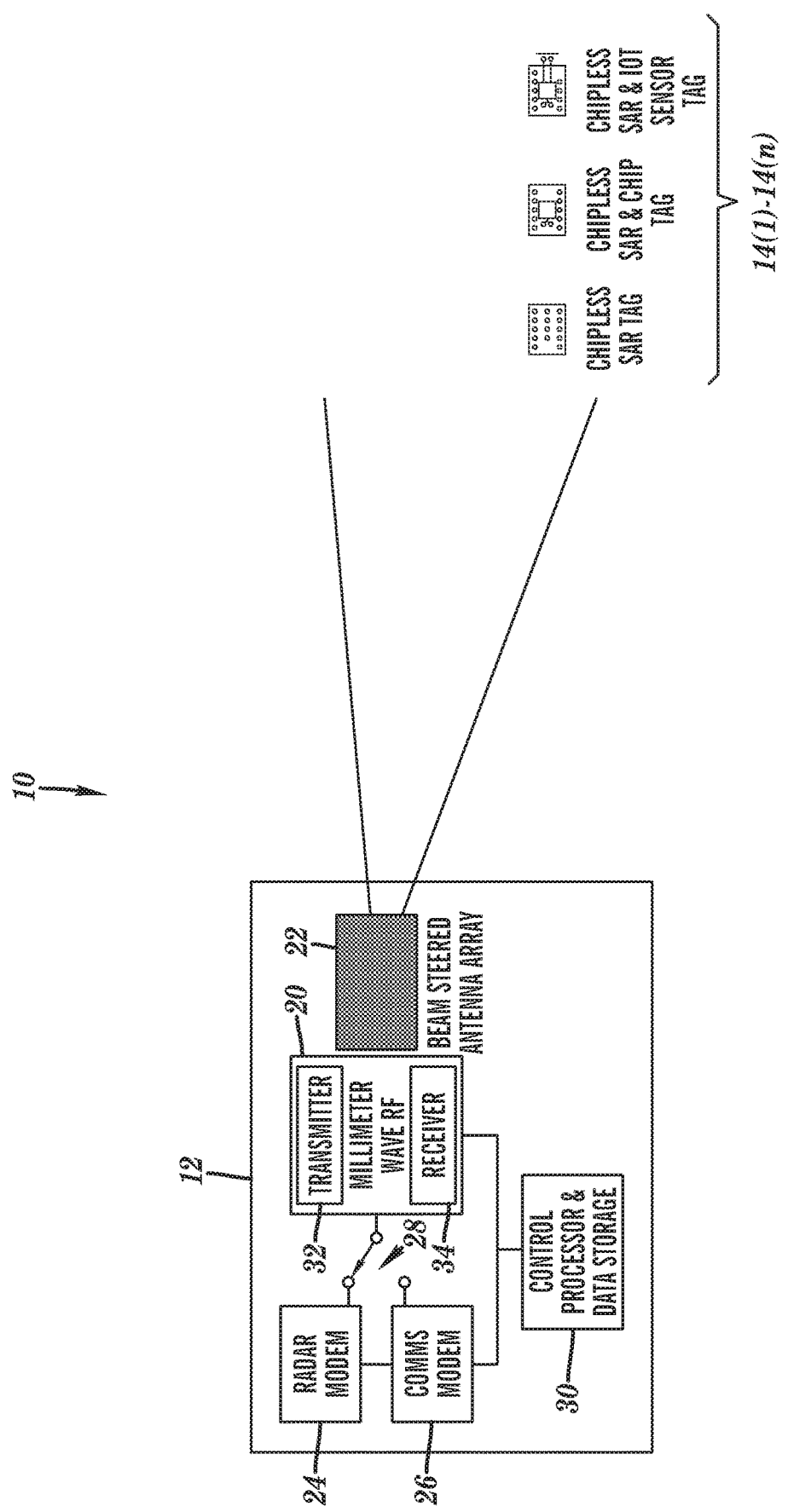
FIG. 1A is an environment including an exemplary multimode RFID system of the present technology including a block diagram of an RFID reader device operating in a radar imaging mode and a schematic view of a plurality of RFID tags to be utilized with the RFID reader device.

An example of a multimode millimeter wave RFID system 10 is illustrated in FIG. 1. In this particular example, the system 10 includes a multimode RFID reader device 12 and a plurality of tags 14(1)-14(n) and IOT devices with smart sensors, although the system 10 may include other types and/or number of other systems, devices, components, and or other elements in other combinations, including additional multimode RFID reader devices and any number of RFID tags and sensor devices, by way of example only. In this example, the RFID reader device 12 includes a millimeter wave radiofrequency device 20, a beam steered antenna array 22, a radar modem 24, a communications modem 26, a switch 28, and a RFID control computing device 30, although the RFID reader device 12 may include other types and/or numbers of components and or other elements in other combinations, including additional electronics, such as analog to digital converters. The RFID reader device 12 can advantageously be programmed to either be in a radar imaging mode for locating and decoding chip-less RFID tags, or a transponder/communications mode for communicating with the located chips in the far field. The dual mode approach allows the RFID reader device 12 to provide a single system solution for use with all categories of RFID tags, as well as IOT devices having smart sensors.

The millimeter wave radiofrequency device 20 includes a transmitter 32 and receiver 34 located on a chip for transmitting and receiving millimeter wave radiofrequency through the beam steered antenna array 22, respectively, although the millimeter wave radiofrequency device 20 may include other types and/or numbers of elements, such as a digital signal processor, by way of example only. In one example, the millimeter wave radiofrequency device 20 is configured to operate at up to 240 GHz with an associated wavelength ($\lambda$) of 1.25 millimeters, although the millimeter wave radio frequency device 20 may operate at other frequencies in other examples. The millimeter wave radiofrequency device 20 may be formed using silicon germanium semiconductor process, such as disclosed in Bredendiek, C. et al., "A 240 GHz single-chip radar transceiver in a SiGe bipolar technology with on-chip antennas and ultra-wide tuning range," IEEE Radio Frequency Integrated Circuits Symposium (2013) and "High-Resolution 240-GHZ Radar with SiGe Chip", Fraunhofer Institute for High Frequency Physics and Radar Techniques FHR (2018), the disclosures of which are hereby incorporated by reference in their entirety.

The beam steered antenna array 22 is coupled to the millimeter wave radiofrequency device 20 to transmit and receive millimeter wave radiofrequency. The beam steered antenna array 22 is programmed to be operable in both a synthetic aperture radar (SAR) mode and a communications mode. In the SAR mode, the beam steered antenna array 22 is programmed to reduce the number of active elements such that the beam pattern emitted from the beam steered antenna array 22 is widened as illustrated in FIG. 1A. In one example, the beam steered antenna array 22 may be programmed using programmable hardware logic, although in other examples, the beam steered antenna may be controlled using the RFID control computing device 30 as described below. The widened beam pattern can be utilized for high resolution SAR imaging for locating, imaging, and decoding chip-less RFID tags as disclosed in U.S. Pat. Nos. 7,460,014 and 7,498,940, the disclosures of which are incorporated herein by reference in their entirety, and described in further detail below. The SAR mode may be utilized for three-dimensional radar imaging of a scan area to identify and locate RFID tags in a scan area defined by the field of the beam steered antenna array 22 with a spatial resolution of less than 1 mm in some examples.

Figure 1B:
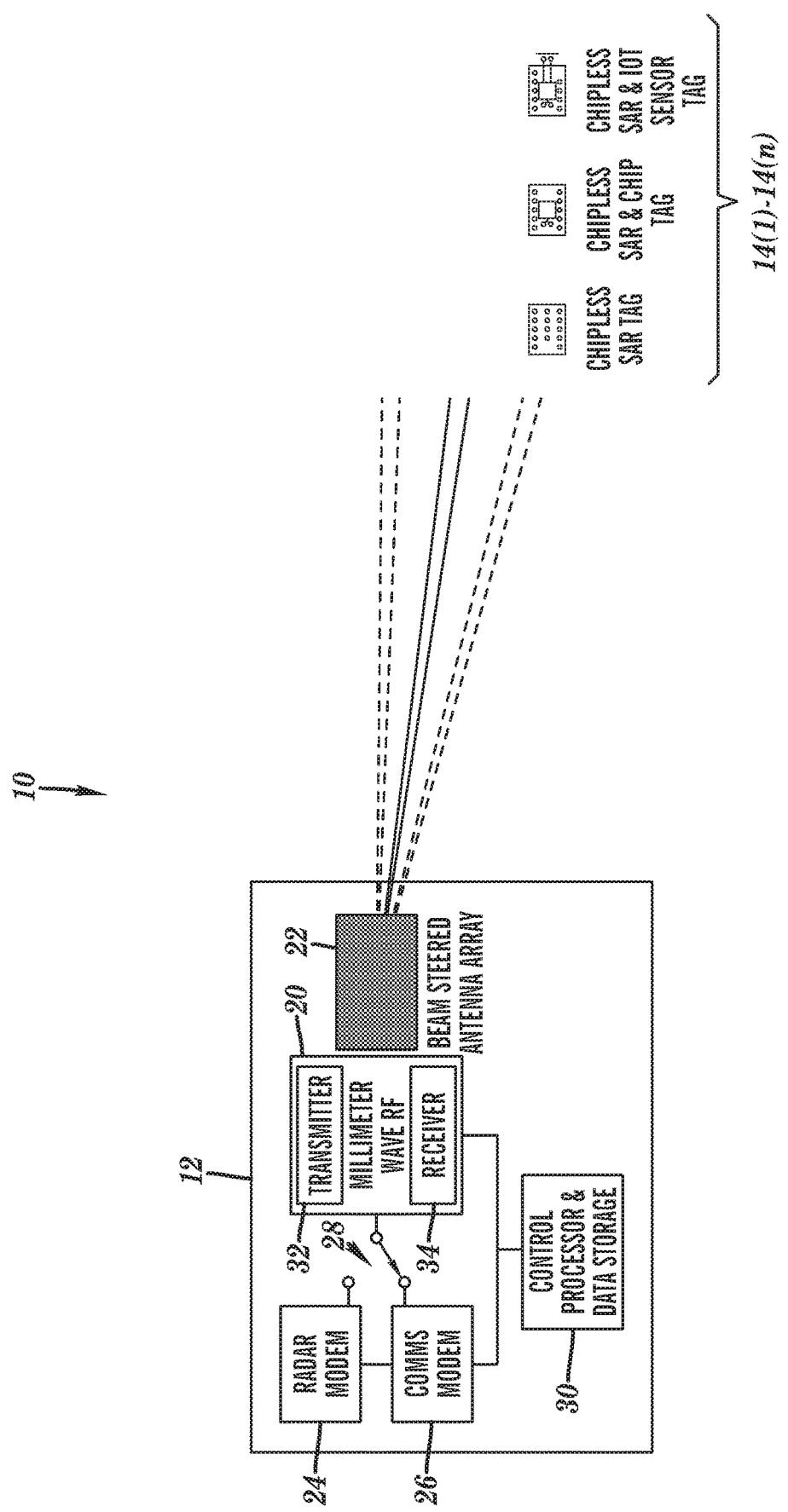
FIG. 1B is the environment of FIG. 1A with the exemplary RFID reader device operating in a communications mode.

In the transponder/communications mode, the beam steered antenna array 22 has a pattern that can be narrowed to selectively power, and communicate with, various individual RFID tags, such as RFID tags 14(1)-14(n), or smart sensor devices located within the array pattern emitted from the beam steered antenna array 22, as shown in FIG. 1B. The beam steered antenna array 22 has a small aperture, on the order of 50 to 100 mm in cross-section, which in the selected frequency range of 240 GHz, by way of example, enables sufficient radiated power to be delivered to a chipped RFID tag having an IC or a smart sensor to provide the required operating power for the device.

In one example, the millimeter wave radiofrequency device 20 and the beam steered antenna array 22 are formed as an integrated antenna and chip package as disclosed in U.S. Pat. Nos. U.S. Pat. Nos. 7,768,457, 7,868,841, and 8,477,070, the disclosures of which are incorporated herein by reference in their entirety, although other packing and manufacturing techniques may be employed.

Figure 2:
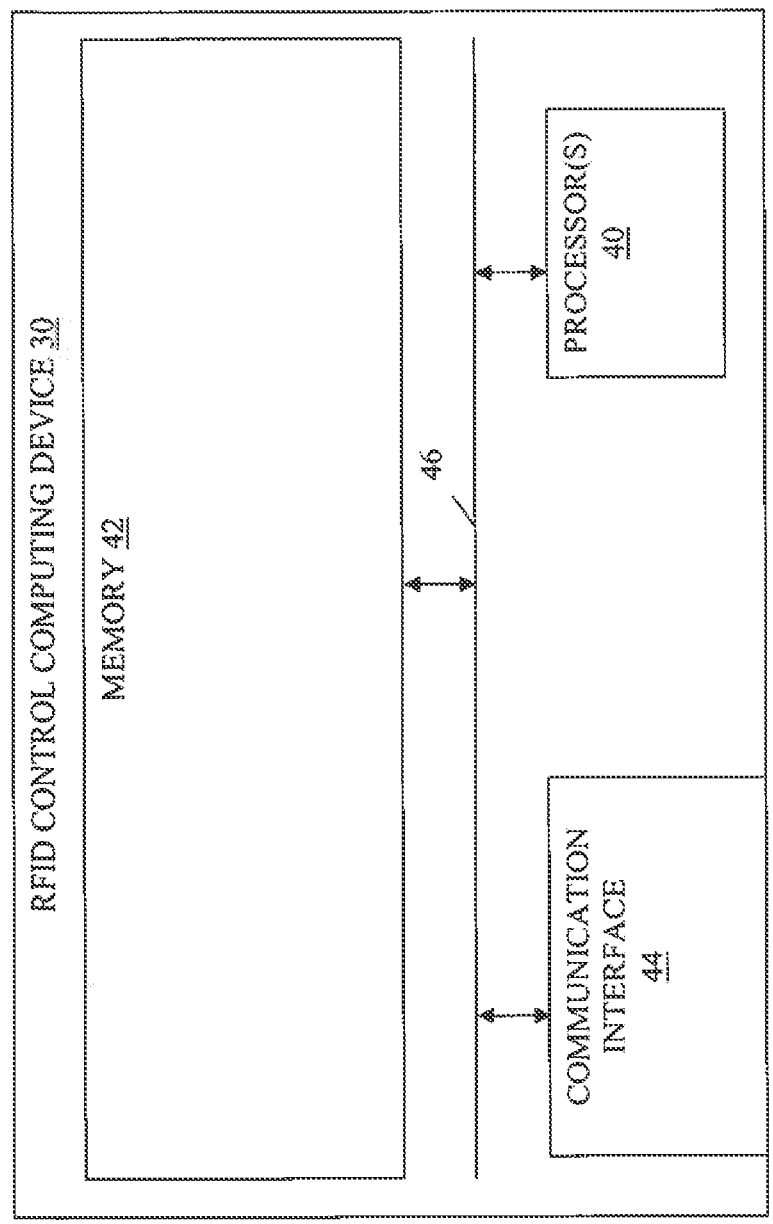
FIG. 2 is a block diagram of an exemplary RFID control computing device for the RFID reader device.

Referring now more specifically to FIGS. 1 and 2, the RFID control computing device 30 in this example includes one or more processor(s) 40, a memory 42, and/or a communication interface 44, which are coupled together by a bus 46 or other communication link, although the RFID control computing device 30 can include other types and/or numbers of elements in other configurations. In one example, the RFID control computing device 30 is a microcontroller located on the same chip as the millimeter wave radiofrequency device 20.

The processor(s) 40 of the RFID control computing device 30 may execute programmed instructions stored in the memory 42 for the any number of the functions described and illustrated herein. In one example, the processor(s) 40 provides instructions to the millimeter wave radiofrequency device 20 and the beam steered antenna array 22 for operation in the different modes described above. In another example, the processor(s) 40 receive radar image data from the millimeter wave radiofrequency device 20 and process the radar image data to identify and locate RFID tags in the field of the beam steered antenna array 22. In yet another example, the processor(s) 40 provide instructions for communicating with the RFID tags or smart sensors in the field. The processor(s) may 40 include one or more CPUs, GPUs, or general purpose processors with one or more processing cores, for example, although other types of processor(s) can also be used such as FPGA devices.

The memory 42 stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s), can be used for the memory.

Accordingly, the memory 42 of the RFID control computing device 30 can store one or more applications or programs that can include computer executable instructions that, when executed by the processor (s) 40 RFID control computing device 30, cause the RFID control computing device 30 to perform actions described below. The application(s) can be implemented as modules, threads, pipes, streams, or components of other applications. Further, the application(s) can be implemented as operating system extensions, module, plugins, or the like.

Even further, the application(s) may be operative in a cloud-based computing environment. The application(s) can be executed within or as virtual machine(s) or virtual server(s) that may be managed in a cloud-based computing environment. Also, the application(s) may be running in one or more virtual machines (VMs) executing on the image acquisition computing device. The communication interface 44 operatively couples and communicates between the RFID control computing device 30 and the millimeter wave radiofrequency device 20, the communications modem 26, and the radar modem 24.

In another example, the RFID control computing device 30 is a highly integrated microcontroller device with a variety of on-board hardware functions, such as analog to digital converters, digital to analog converters, serial buses, general purpose I/O pins, RAM, and ROM. The microcontroller may be located on the same chip as the millimeter wave radiofrequency device 20, by way of example.

Although the exemplary RFID control computing device 30 is described and illustrated herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

In addition, two or more computing systems or devices can be substituted for the RFID control computing device 30. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

The millimeter wave radiofrequency device 20 is coupled to the radar modem 24 and the communications modem 26 through the switch 28, which allows the RFID reader device 12 to alternate between operation in the SAR mode as shown in FIG. 1A, and the communications mode as shown in FIG. 1B, as described in further detail below. In one example, the radar modem 24 is a frequency modulated continuous wave (FMCW) radar modem, although other suitable radar modems may be employed. In one example, the communications modem 26 is a quadrature amplitude modulated communications modem, although other suitable communications modems may be employed.

Referring now more specifically to FIGS. 1 and 3, the RFID system 10 includes a plurality of RFID tags 14(1)-14(n) that may be utilized with the RFID reader device 12 described above. Each of the RFID tags 14(1)-14(n) may use parametric reflective technology that may be utilized for SAR as disclosed by way of example in U.S. Pat. Nos. 7,460,014 and 7,498,940, the disclosures of which are incorporated herein by reference in their entirety. Specifically, in this example the RFID tags 14(1)-14(n) include a plurality of antenna elements 50 that are formed on a substrate or directly on an object, such as an object in the IOT. The antenna elements 50 are oriented and have dimensions to provide polarization and phase information representative of the information encoded on one of the RFID tags, 14(1)-14(n), on which can be read-out by the RFID reader device 12. The antenna elements 50 re-radiate radiofrequency signals received from the RFID reader device back to the RFID reader device to form a radar image. The radar image may be utilized to spatially locate each of the RFID tags 14(1)-14(n) in the scanned area, such that the RFID reader device can ascertain the location of the RFID tags 14(1)-14(n) at a spatial resolution of less than one millimeter, by way of example, target the direction of the narrow millimeter wave beam or other beam for reading each of the RFID tags 14(1)-14(n).

Figure 3C:
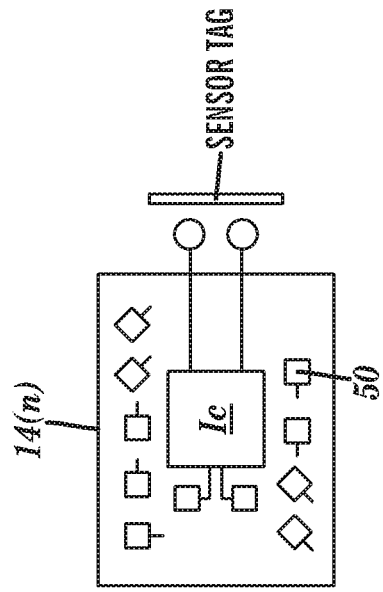
FIGS. 3A-3C are schematic views of three exemplary RFID tags that can be employed in the RFID system shown in FIG. 1.
Figure 3B:
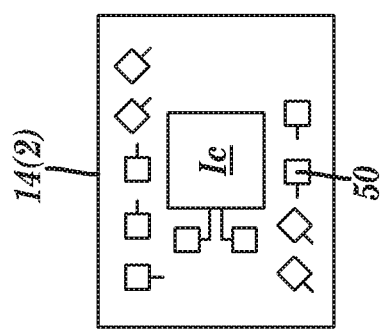
Figure 3A:
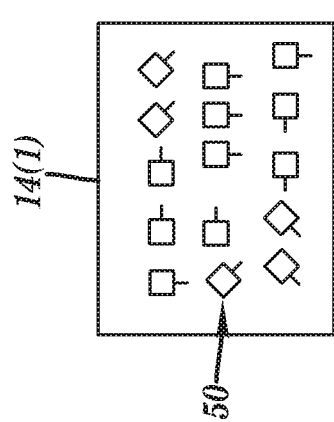
Figure 4:
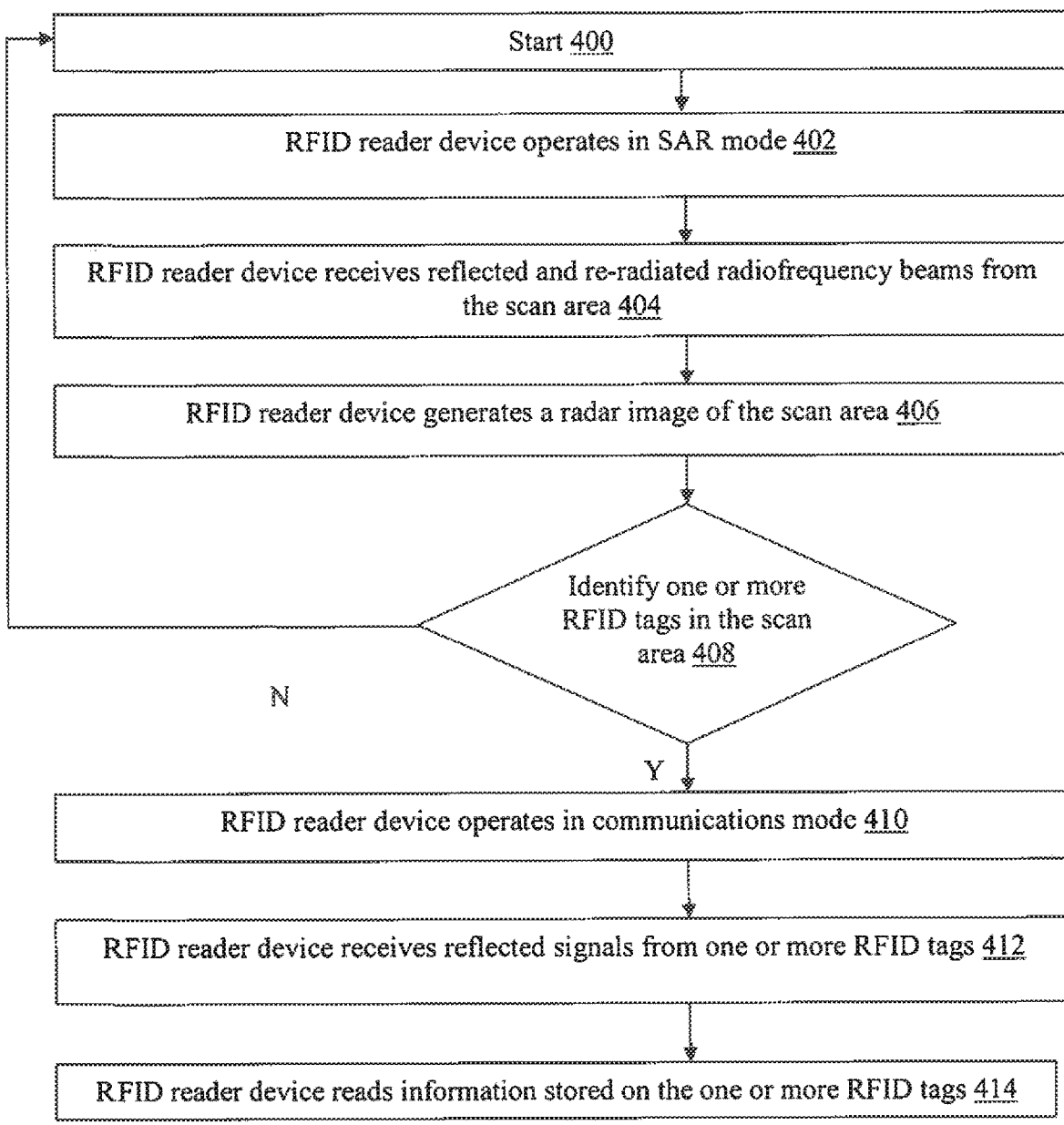
FIG. 4 is a flowchart of an exemplary operation of the RFID system of FIGS. 1A and 1B.

The RFID reader device 12 can be utilized with entirely chip-less SAR tags as illustrated in FIG. 3A, or the RFID reader device 12 can also be used to identify SAR elements located on chips also having an IC or a sensor tag associated therewith, as illustrated in FIGS. 3B and 3C, respectively. The RFID reader device 12 can also be utilized when in its communications mode, as described in further detail below, to selectively power and communicate with the chips illustrated in FIGS. 3B and 3C.

By utilizing RFID tags 14(1)-14(n) that have SAR chipless type patterns in conjunction with smart chips (FIG. 3B) and smart sensors (FIG. 3C), various RFID tag combinations can be designed for use with various RFID and smart sensor IOT applications using the RFID reader device 12. A tag can be designed for chip-less, SAR use only (FIG. 3A), SAR use with a transponder chip (FIG. 3B), or SAR use with transponder and IOT smart sensor technology (FIG. 3C). The technology can be utilized with any smart sensors known in the art for sensing any physical parameter. By including the SAR chip-less technology on each of the RFID tags 14(1)-14(n), the SAR radar function allows any type of RFID tag to be spatially located with high resolution, in addition to other transponder and smart sensor features.

An exemplary operation of the multimode RFID reader device 12 of the present technology will now be described with reference to FIGS. 1-4. The exemplary operation starts in step 400.

First, in step 402 the RFID reader device 12 operates in SAR mode to output a wide beam that transmits electromagnetic radiation through the beam steered antenna array 22 to a large scan area at a desired frequency as shown in FIG. 1A. The SAR mode uses the radar modem 24, which is coupled to the millimeter wave radiofrequency device 20 by the switch 28. In this example, the RFID reader device 12 transmits the radiation at a frequency of 240 GHz with an associated wavelength (λ) of 1.25 millimeters, although other frequencies may be employed. In one example, the operational frequency between 60 GHz up to a terahertz. In this example, the operational range of the system extends from a few centimeters up to several meters.

The electromagnetic radiation transmitted from the beam steered antenna array 22 is received at the RFID tags 14(1)-14(n) in the scanned area, causing the SAR antenna structures of the RFID tags 14(1)-14(n) to resonate at the desired frequency and re-radiate the electromagnetic signals back toward the RFID reader device 12.

In step 404, the RFID reader device 12 receives reflected radiofrequency beams from the scan area and re-radiated radiofrequency beams from any of the one or more RFID tags 14(1)-14(n) located within the scan area resulting from the transmission of the first radiofrequency beam to the scan area in step 402.

In step 406, the RFID control computing device 30 of the RFID reader device 12 generates a radar image of the scanned area using the received reflected radiofrequency beams from the scan area and re-radiated radiofrequency beams from any of the one or more RFID tags 14(1)-14(n) located within the scan area. The RFID reader device 12 samples and stores the received signals from the reflected electromagnetic radiation from all objects in the scanned area, as well as any of the one or more RFID tag(s) 14(1)-14(n) located in the scan area, and builds a signal phase history in the memory 42 of the RFID control computing device 30. The RFID control computing device 30 processes the phase history and polarization samples obtained using general SAR signal processing algorithms as are known in the art, such as mathematical coherent phase analysis, although other processing algorithms are contemplated. The RFID computing device 30 is then able to generate images of the scanned area from the phase history samples and associated polarization data.

In step 408, the RFID reader device determines whether it is able to identify one or more of the RFID tags 14(1)-14(n) in the scan area. In other words, the RFID computing device 30 is able to "view" the scanned area using radar technology and "see" the RFID tags 14(1)-14(n) and distinguish the RFID tags 14(1)-14(n) from other objects and RFID tags in the scanned area by the orientations and dimensions of the antenna structures 50 thereon. The use of radiofrequency waves at 240 GHz, by way of example, allows for three-dimensional radar imaging to identify and locate RFID tags 14(1)-14(n) or smart sensors having the SAR technology located thereon in the field of the beam steered antenna array 22 with a spatial resolution of less than 1 mm, for example. The SAR interrogation can also be utilized to decode chip-less RFID tags, such as the RFID tag 14(1) illustrated in FIG. 3A, which does not include an IC thereon. If in step 408 the RFID reader device 12 does not identify any RFID tags in the scan area, the No branch is taken and the process may repeat from the start 400 for another scan area.

If in step 408, the RFID reader device 12 identifies one or more RFID tags 14(1)-14(n) in the scan area, the Yes branch is taken to step 410. Next, in step 410 the RFID computing device 30 configures the RFID reader device 12 to operate in the transponder/communications mode to selectively power and communicate with RFID tags 14(1)-14(n) whose location has been identified in the scanned area using the communications modem 26 as shown in FIG. 1B, although in other examples programmable hardware logic may be utilized to configure the RFID reader device 12 to operate in the communications mode. The beam steered antenna array 22 has a small aperture, on the order of 50 to 100 mm in cross-section, which in the selected frequency range of 240 GHz, by way of example, enables sufficient radiated power to be delivered to a chipped RFID tag having an IC or a smart sensor to provide the required operating power for the device, such as the RFID tags illustrated in FIGS. 3B and 3C. The technology can be used to power and communicate with these types of in any manner known in the art. The antenna beam pattern of the beam steered antenna array 22 can be made sufficiently narrow such that each tag or device within the pattern can be selectively powered and provide communications independently of other tags and devices.

In step, 412, the RFID reader device 12 receives reflected signals from the RFID tags 14(1)-14(n) encoded with the information stored thereon through the beam steered antenna array 22. In step 414, the RFID computing device 30 can then read that information using known techniques.

Accordingly, the RFID system 10 of the present technology advantageously provides an RFID system that can be used with SAR-enabled tags. The RFID reader device 12 is configured to either be in the SAR mode for locating and decoding chip-less tags using the radar modem 24 and the wide antenna pattern, or in a transponder/communications mode, using the communication modem 26 and a narrow beam steered pattern. This dual mode approach provides a single system solution for all categories of RFID tags and allows RFID technology to be utilized in various applications, including the IOT.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method, implemented by one or more computing devices, for operating a radiofrequency device configured to transmit and receive electromagnetic radiation through an antenna array coupled to the radiofrequency device, the method comprising:

operating the radiofrequency device in a first mode to transmit a first radiofrequency beam to a scan area through the antenna array;

determining a spatial location for one or more RFID tags located within the scanned area from a radar image generated based on reflected radiofrequency beams from the scan area and re-radiated radiofrequency beams from the one or more RFID tags located within the scan area resulting from the transmission of the first radiofrequency beam to the scan area; and operating the radiofrequency device in a second mode to selectively transmit a second radiofrequency beam to a subset of the one or more RFID tags, based on the determined spatial location of the one or more RFID tags located within the scan area, to power an integrated circuit or sensor located on and to communicate with the subset of the one or more RFID tags.

2. The method of claim 1, wherein the radiofrequency device is a millimeter wave radiofrequency device.

3. The method of claim 2, wherein the radiofrequency device is configured to operate at 240 GHz.

4. The method of claim 1, wherein the antenna array is a beam steered antenna array.

5. The method of claim 4, wherein the beam steered antenna array has an aperture of less than 100 mm in cross section.

6. The method of claim 5, wherein the first mode is a synthetic aperture radar mode that utilizes a radar modem to transmit the first radiofrequency beam from the radiofrequency device.

7. The method of claim 6, wherein the first radiofrequency beam is a wide pattern radiofrequency beam.

8. The method of claim 5, wherein the second mode is a transponder mode that utilizes a communications modem to transmit the second radiofrequency beam from the radiofrequency device.

9. The method of claim 8, wherein the second radiofrequency beam is a narrow radiofrequency beam.

10. The method of claim 1, wherein the second radiofrequency beam is configured to power an integrated circuit or sensor located on the subset of the one or more RFID tags.

11. The method of claim 1, wherein the second radiofrequency beam is configured to communicate with the at least one of the one or more RFID tags.

12. A radiofrequency identification control computing device, comprising memory comprising programmed instructions stored thereon and one or more processors configured to execute the stored programmed instructions to:
operate a radiofrequency device, the radiofrequency device configured to transmit and receive electromagnetic radiation through an antenna array coupled to the radiofrequency device, in a first mode to transmit a first radiofrequency beam to a scan area through the antenna array;
determine a spatial location for one or more RFID tags located within the scanned area from a radar image generated based on reflected radiofrequency beams from the scan area and re-radiated radiofrequency beams from the one or more RFID tags located within the scan area resulting from the transmission of the first radiofrequency beam to the scan area; and
operate the radiofrequency device in a second mode to selectively transmit a second radiofrequency beam to a subset of the one or more RFID tags, based on the determined spatial location of the one or more RFID tags located within the scan area, to power an integrated circuit or sensor located on and to communicate with the subset of the one or more RFID tags.

13. The apparatus of claim 12, wherein the radiofrequency device is a millimeter wave radiofrequency device.

14. The apparatus of claim 13, wherein the radiofrequency device is configured to operate at 240 GHz.

15. The apparatus of claim 12, wherein the antenna array is a beam steered antenna array.

16. The apparatus of claim 15, wherein the beam steered antenna array has an aperture of less than 100 mm in cross section.

17. The apparatus of claim 16, wherein the first mode is a synthetic aperture radar mode that utilizes a radar modem to transmit the first radiofrequency beam from the radiofrequency device.

18. The apparatus of claim 17, wherein the first radiofrequency beam is a wide pattern radiofrequency beam.

19. The apparatus of claim 16, wherein the second mode is a transponder mode that utilizes a communications modem to transmit the second radiofrequency beam from the radiofrequency device.

20. The apparatus of claim 19, wherein the second radiofrequency beam is a narrow radiofrequency beam.

21. The apparatus of claim 12, wherein the second radiofrequency beam is configured to power an integrated circuit or sensor located on the at least one of the one or more RFID tags.

22. The apparatus of claim 12, wherein the second radiofrequency beam is configured to communicate with the subset of the one or more RFID tags.

23. A non-transitory computer readable medium having stored thereon instructions for operating a radiofrequency device configured to transmit and receive electromagnetic radiation through an antenna array coupled to the radiofrequency device, the medium comprising executable code that, when executed by one or more processors, causes the processors to:
operate the radiofrequency device in a first mode to transmit a first radiofrequency beam to a scan area through the antenna array;
determine a spatial location for one or more RFID tags located within the scanned area from a radar image generated based on reflected radiofrequency beams from the scan area and re-radiated radiofrequency beams from the one or more RFID tags located within the scan area resulting from the transmission of the first radiofrequency beam to the scan area; and
operate the radiofrequency device in a second mode to selectively transmit a second radiofrequency beam to a subset of the one or more RFID tags, based on the determined spatial location of the one or more RFID tags located within the scan area, to power an integrated circuit or sensor located on and to communicate with the subset of the one or more RFID tags.

24. The medium of claim 23, wherein the radiofrequency device is a millimeter wave radiofrequency device.

25. The medium of claim 24, wherein the radiofrequency device is configured to operate at 240 GHz.

26. The medium of claim 23, wherein the antenna array is a beam steered antenna array.

27. The medium of claim 26, wherein the beam steered antenna array has an aperture of less than 100 mm in cross section.

28. The medium of claim 27, wherein the first mode is a synthetic aperture radar mode that utilizes a radar modem to transmit the first radiofrequency beam from the radiofrequency device.

29. The medium of claim 26, wherein the first radiofrequency beam is a wide pattern radiofrequency beam.

30. The medium of claim 27, wherein the second mode is a transponder mode that utilizes a communications modem to transmit the second radiofrequency beam from the radiofrequency device.

31. The medium of claim 29, wherein the second radiofrequency beam is a narrow radiofrequency beam.

32. The medium of claim 23, wherein the second radiofrequency beam is configured to power an integrated circuit or sensor located on the at least one of the one or more RFID tags.

33. The medium of claim 23, wherein the second radiofrequency beam is configured to communicate with the subset of the one or more RFID tags.

\* \* \* \* \*